(12) United States Patent
Banerjee

(10) Patent No.: US 8,089,494 B2
(45) Date of Patent: Jan. 3, 2012

(54) IMAGE ROTATION

(75) Inventor: Serene Banerjee, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 577 days.

(21) Appl. No.: 12/323,485

(22) Filed: Nov. 26, 2008

(65) Prior Publication Data

US 2010/0091037 A1    Apr. 15, 2010

(30) Foreign Application Priority Data

Oct. 13, 2008    (IN) .......................... 2488/CHE/2008

(51) Int. Cl.
*G09G 5/00* (2006.01)

(52) U.S. Cl. ....................................... 345/657

(58) Field of Classification Search .................. 345/657
See application file for complete search history.

(56) References Cited

U.S. PATENT DOCUMENTS

| | | | |
|---|---|---|---|
| 4,916,746 A | | 4/1990 | Yeschick |
| 4,975,977 A | * | 12/1990 | Kurosu et al. .................. 382/277 |
| 5,093,653 A | * | 3/1992 | Ikehira ........................... 345/657 |
| 5,187,753 A | * | 2/1993 | Bloomberg et al. ........... 382/289 |
| 5,340,309 A | * | 8/1994 | Robertson ........................ 433/69 |
| 5,355,420 A | * | 10/1994 | Bloomberg et al. ........... 382/155 |
| 5,359,706 A | * | 10/1994 | Sterling ........................... 345/657 |
| 5,568,600 A | * | 10/1996 | Kaba ............................... 345/648 |
| 6,097,855 A | * | 8/2000 | Levien ............................ 382/296 |
| 6,301,022 B1 | * | 10/2001 | Washio et al. ................. 358/488 |
| 7,576,758 B2 | | 8/2009 | Kothandaraman et al. |

OTHER PUBLICATIONS

Michael Unser, Philippe Thévenaz, Leonid P. Yaroslavsky, "Convolution-based interpolation for fast, high-quality rotation of images",IEEE Transactions on Image Processing 4(10): p. 1371-1381, 1995.

R. C. Gonzatez, R. E. Woods "Digital Image Processing", Prentice Hall, 2nd ed., 2002.

Alan W Paeth, "A Fast Algorithm for General Raster Rotation", Proc. Graphics Interface: pp, 179-195, May 1986.

D. Fraser, "Comparison at High Spatial Frequencies of Two-pass and One-pass Geometric Transformation Algorithms", Computer Vision, Graphics and Image Processing, vol. 46, pp. 267-283, 1989.

Z. Yu, J. Dong, Z. Wei and J. Shen. "A Fast Image Rotation Algorithm for Optical Character Recognition on Chinese Documents", Proc. IEEE Int. Conf. on Communication, Circuits and Systems, vol. 1, pp. 485-489, Jun. 2006.

C. B. Owen and F. Makedon, "High Quality Alias Free Image Rotation", Proc. IEEE Asilomar Conf. on Signals, Systems and Computers, vol. 1, pp. 115-119, Nov. 1996.

(Continued)

*Primary Examiner* — Ryan R Yang

(57) ABSTRACT

Presented is a method of rotating an input image comprising a plurality of rows of input pixels by a predetermined arbitrary angle to generate a rotated output image comprising a plurality of rows of output pixels. The method comprises: receiving a first input segment comprising a first contiguous subset of the plurality of rows of input pixels; applying to the first input segment a transformation depending on the predetermined angle and storing the transformed result in a memory; receiving a second input segment comprising a second contiguous subset of the plurality of rows of input pixels, the second subset being adjacent to the first in the input image; applying the transformation to the second input segment and storing the transformed result in a memory; and generating a first output segment based on the transformed results of the first and second input segments, the output segment comprising a contiguous subset of the plurality of rows of output pixels.

15 Claims, 6 Drawing Sheets

OTHER PUBLICATIONS

B. Shen and I. K. Sethi, "Scanline Algorithm in Compressed Domain", SPIE Proc. On Digital Video Compression Algorithms and Technologies, vol. 2668, Apr. 1996.

S. Chandran, A. K. Potty, M. Sohoni, "Fast Image Transforms Using Diophantine Methods", IEEE Trans. On Image Proc., vol. 12, No. 6, pp. 678-684: Jun. 2003.

* cited by examiner

IMAGE ROTATION

RELATED APPLICATIONS

Benefit is claimed under 35 U.S.C. 119(a)-(d) to Foreign application Ser No. 2488/CHE/2008 entitled "IMPROVED IMAGE ROTATION" by Hewlett-Packard Development Company, L.P., filed on 13 Oct., 2008, which is herein incorporated in its entirety by reference for all purposes.

BACKGROUND

Image rotation is a fundamental image processing task and the need to rotate images arises in many applications. Although "rotation" through 90-degree intervals is a relatively simple exercise, rotation by an arbitrary angle is more complex.

Rotation by a small arbitrary angle is often required in applications such as scanning, photocopying and facsimile transmission of documents. In these tasks, documents are imaged for reproduction in some form. It is common to observe document skew—that is, rotational misalignment of the output—as a result of incorrect document placement on the platen glass, shifting of the object while closing the scanner lid, or incorrect insertion into a sheet-feeder. The resulting skew makes the reproduction appear unprofessional and can also affect the performance of downstream tasks, such as Optical Character Recognition (OCR) operations. Skew correction improves the quality of scanned/copied documents; and the corrected document images are more useful for tasks such as archiving, modifying, collaborating, communicating, OCR or printing. Skew correction requires detection/estimation of the angular error of the input document followed by image rotation to correct that error. Rotation is therefore a necessary end step for skew correction as well as for geometric manipulation of document images in general.

Previous work on image rotation algorithms includes Michael Unser, Philippe Thévenaz, Leonid P. Yaroslavsky: "Convolution-based interpolation for fast, high-quality rotation of images", IEEE Transactions on Image Processing 4(10): p 1371-1381, 1995. Unser et al. described image rotation with reduced complexity of order $O(M\times N)$, where $M\times N$ is the image size. That is, the complexity increases linearly with the number of pixels in the image. This is achieved by decomposing the rotation operation into three separable, one-dimensional shears along the horizontal and vertical directions, respectively.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
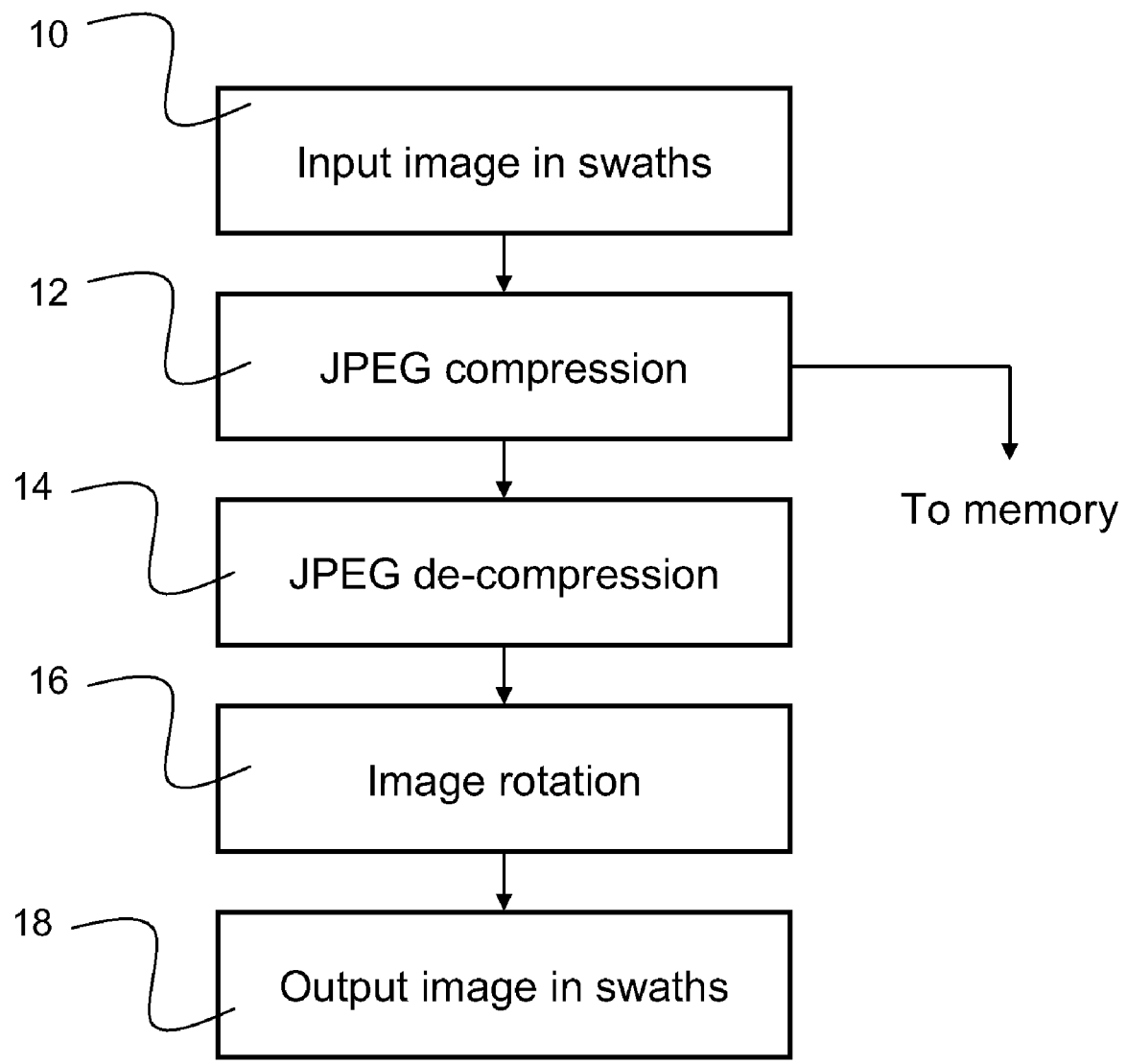
FIG. 1 shows a typical pipeline of operations in an ADF scanner.

Although previous work has reduced the complexity of image rotation by adopting a three-shear approach to synthesize the rotation transformation, all known approaches of this kind require the entire image to be in memory. This is difficult or impossible in some products, including scanners using an Automatic Document Feeder (ADF). In these devices, memory constraints and/or requirements for real-time operations will limit the application of shear-based approaches to image rotation. Related devices which may suffer from the same limitations include Multi-Function Printers (MFP) or All-in-One (AiO) printers. These products integrate print, scan, photocopy and facsimile functions in a single machine. Accurate scanning/imaging of documents is fundamental to the performance of such devices.

In ADF scanners, the input image comes in segments called swaths. Each input segment comprises a number of contiguous rows. By way of example, the number of rows may be in the range 0 to 128, more preferably 32 to 64. Taking a conventional approach, the entire image could be accumulated from all the swaths before running skew detection and correction algorithms. However the current inventors have recognized that skew detection could be performed continuously on an image in real-time with the availability of each swath. For example, the skew-angle could be estimated from the first swath scanned. Such a "real-time" skew detection capability would greatly reduce the memory requirements of the rotation algorithm. Image rotation can commence immediately after a satisfactory skew angle is detected. That is, the inventors have realized that, in the right circumstances, it is not necessary to wait for accumulation of the full image. In AiOs/printers, the image is also printed swath by swath (with a swath size determined by the size of print head). So, if the skew corrected output image is formed swath by swath, the printing can start immediately by printing the first swath, thus reducing the wait time for the user and facilitating memory-constrained embedded implementation.

The relationship between given input swaths and given output swaths depends on many factors, including the size of the swaths and the angle of rotation. Thus, although it is not necessary to wait for accumulation of the full input image, the rotational transformation dictates that there will not be a one-to-one relationship between input and output swaths. The swath-based approach to image rotation therefore requires a small number of input swaths to be buffered in memory until sufficient image data are available to compute an output (rotated) swath. In general—and particularly if the output and input swaths are to have the same number of rows—more than one input swath will be needed to generate any given output swath. Embodiments of the current invention allow the optimal number of input swaths (and thus minimal amount of memory) to be pre-calculated, depending on the angle of rotation. At the same time, the proposed buffering scheme ensures that no distortion of the image or reduction in quality occurs. In particular, the buffering scheme ensures that no blocking artifacts are introduced in the region of the boundaries between swaths.

In a preferred embodiment, the three-shear based rotation discussed above is adapted to be amenable to swath-based input/output. A theoretically optimal memory requirement for swath-based image rotation is determined. Image rotation is then implemented using this optimally-sized memory, using a circular buffer. The time complexity of the proposed algorithm is comparable to that of the three-shear based approach.

FIG. 1 shows a scanner pipeline where the document image is input and/or output in swaths of 32 or 64 rows. As a document is scanned, in step 10, an image is input in horizontal swaths, each swath consisting of a contiguous set of rows. JPEG compression may be carried out next, in step 12. If the incoming swaths have been JPEG compressed, they will be de-compressed (step 14) before skew correction. The skew correction process comprises estimation of the angle of skew (not shown) and rotation of the image by the corresponding angle in the opposite direction (step 16). Finally, the image is output, for example to a printer print-head, in step 18.

Pre-storing the entire image in memory before rotation 16 is time consuming and memory inefficient. According to an embodiment of the inventive concept, a theoretically optimal memory requirement for this scenario will be computed based on the skew angle, allowing an efficient adaptation of the shear based algorithm using a circular buffer to rotate the image using minimal memory.

Firstly, an overview of 3-shear based rotation, as developed by Unser et al., will be given.

Rotation is the most sophisticated affine transformation. When the original coordinates (u, v) and the rotation angle θ are provided the new coordinates (x, y) of the point being rotated are given by:

$$\begin{bmatrix} x \\ y \end{bmatrix} = \begin{bmatrix} \cos\theta & -\sin\theta \\ \sin\theta & \cos\theta \end{bmatrix} \begin{bmatrix} u \\ v \end{bmatrix}$$

Figure 2:
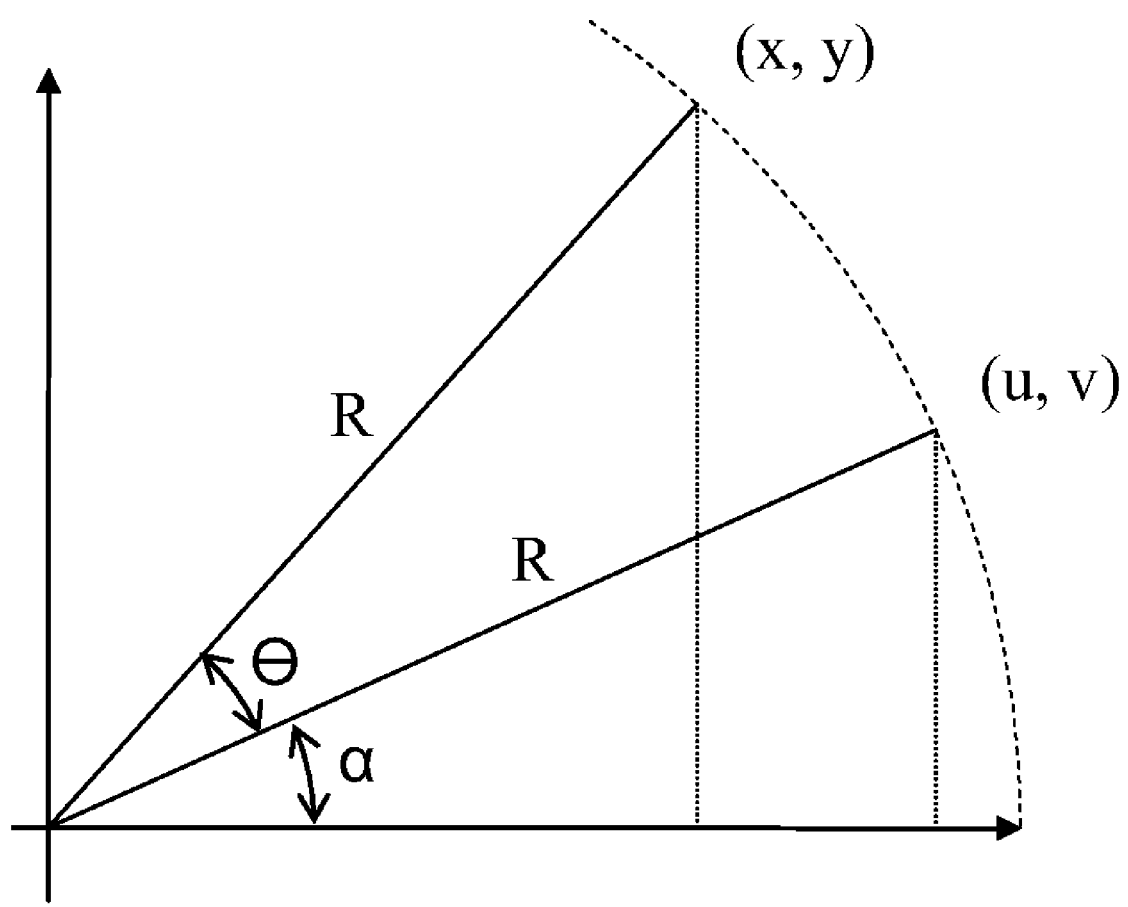
FIG. 2 illustrates the derivation of a matrix multiplication representation of rotation.

This can be deduced from FIG. 2 where it can be seen that:

$\cos\alpha = u/R$, $\sin\alpha = v/R$, $\cos(\alpha+\theta) = x/R = \cos\alpha \cos\theta - \sin\alpha \sin\theta$, and $\sin(\alpha+\theta) = y/R = \sin\alpha \cos\theta + \cos\alpha \sin\theta$.

So:

$x = u \cos\theta - v \sin\theta$, and $y = u \sin\theta + v \cos\theta$.

Figure 3:
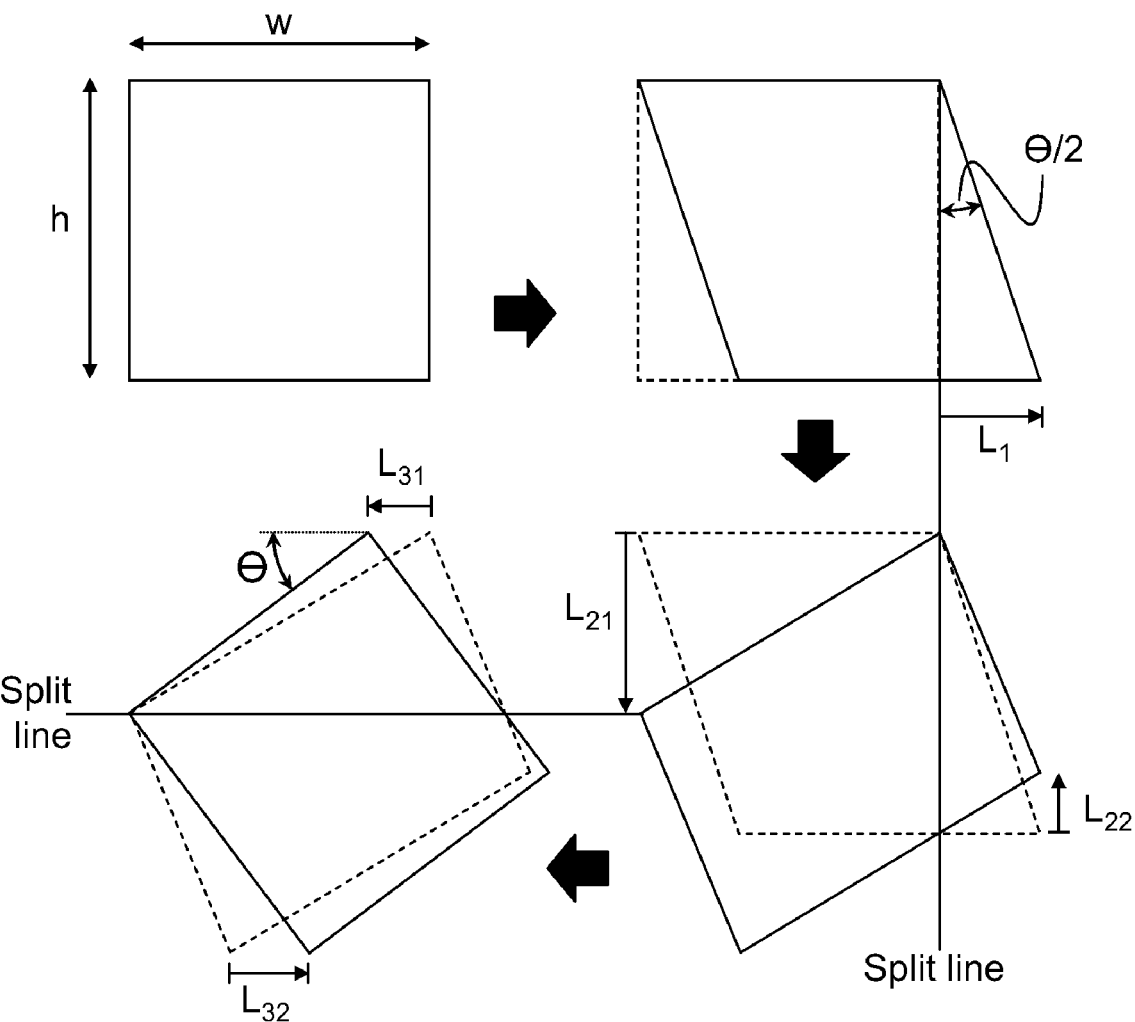
FIG. 3 shows how a rotation transformation can be composed from three shear transformations.

An identical transformation can be achieved by decomposing the rotation matrix into several passes, with each pass performing certain amount of horizontal shearing or vertical shearing as depicted in FIG. 3. The rotation matrix is decomposed into 3 matrices as follows:

$$\begin{bmatrix} \cos\theta & -\sin\theta \\ \sin\theta & \cos\theta \end{bmatrix} = \begin{bmatrix} 1 & -\tan\frac{\theta}{2} \\ 0 & 1 \end{bmatrix} \begin{bmatrix} 1 & 0 \\ \sin\theta & 1 \end{bmatrix} \begin{bmatrix} 1 & -\tan\frac{\theta}{2} \\ 0 & 1 \end{bmatrix}$$

In FIG. 3, the input to each shear operation is depicted by dashed lines and the output of each shear by solid lines. The output of one phase forms the input to the next phase.

The total shearing amount for the first pass is $L1 = h \tan(\theta/2)$, where h is the image height. The operation involved in this pass is shifting each row horizontally to the right. The shift amount increases linearly from 0 to L1 while rows are processed from top to bottom. The first shear results in a parallelogram shape, as shown in the top-right corner of FIG. 3.

For the second pass, there are different total shear amounts and directions for columns of pixels on either side of a split line. The split line thus marks a vertical line, which is not shifted by the vertical shear operation. To the left of the split line, the shear is downward by a total of $L21 = w \sin(\theta)$. To the right of the split line, the shear is $L22 = h(1-\cos(\theta))$ upward. Here w is image width.

The split line is a convenient reference point of zero translation. Alternatively another reference could equally be chosen. For example, the zero-shift reference could lie at the left (top-left corner) of the parallelogram. In this case, the total shear (upward) would be L22-L21.

For the third pass, taking a horizontal split line through the upper left corner of the transformed shape as the reference, there are again different total shear amounts and directions for blocks above the split line and beneath the split line. These are $L31 = w(1-\cos(\theta))$ to the left, and $L32 = h(\sin(\theta)-\tan(\theta/2))$, to the right, respectively.

Figure 4:
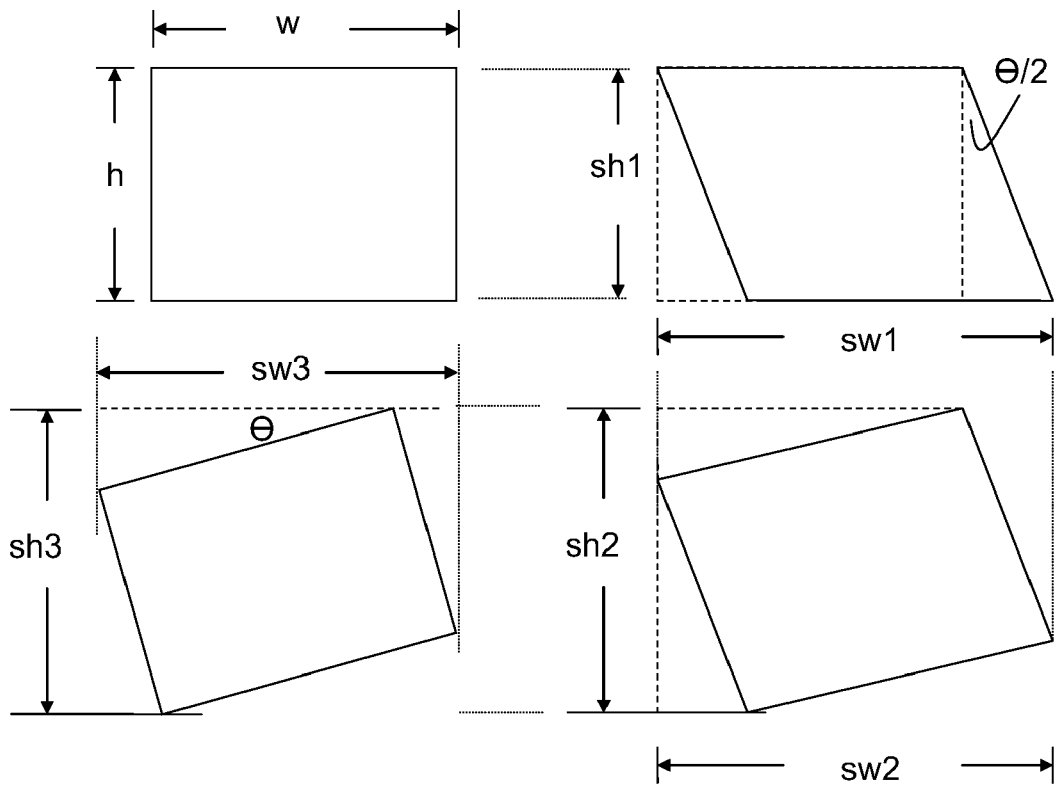
FIG. 4 shows the dimensions of the image after the first, second and third shears.

From the above discussion and as illustrated in FIG. 4, the dimensions of the image after each shear are:

$sw1 = shear1\_width$
$\quad = image\_width + image\_height * abs(\tan(\theta/2))$ $sh1 = shear1\_height = image\_height$ $sw2 = shear2\_width = sw1 = shear1\_width$ $sh2 = shear2\_total\_height$
$\quad = image\_width * abs(\sin(\theta)) +$
$\quad\quad image\_height * \cos(\theta) + 1$ $sw3 = shear3\_total\_width$
$\quad = image\_height * abs(\sin(\theta)) +$
$\quad\quad image\_width * \cos(\theta) + 1$ $sh3 = shear3\_height = shear2\_height$ Based on the above discussion, the pseudo code for the three-shear rotation is as follows:

| | |
|---|---|
| for input image do | // Begin image |
| for each row do | // Begin horizontal shear |

Calculate offset as image_width+row_number*abs(tan(θ/2));
Fill pixels up to offset with background color;
Bilinearly interpolate two adjacent pixels and place it in the new location until image_width is reached;
Fill remaining pixels up to new width (sw1) with background color;

| | |
|---|---|
| end | // End horizontal shear |
| for each column do | // Begin vertical shear |

Calculate offset as column_number*abs(sin(θ))+image_height*cos(θ)+1;
Fill pixels up to offset with background color;
Bilinearly interpolate two adjacent pixels and place it in the new location until image_height is reached;

Fill remaining pixels up to new height (sh2) with background color;

| | |
|---|---|
| end | // End vertical shear |
| for each row do | // Begin horizontal shear |

Calculate offset as row_number*abs(sin(θ))+image_width*cos(θ)+1;

Fill pixels up to offset with background color;

Bilinearly interpolate two adjacent pixels and place it in the new location until image_width is reached;

Fill remaining pixels up to new width (shear3_total_width) with background color;

| | |
|---|---|
| end | // End horizontal shear |
| end | // End image |

The use of bilinear interpolation is one of a number of interpolation options and represents a compromise between simplicity and output image quality. Other techniques for interpolation (re-sampling) in one dimension will be well known to those skilled in the art of image processing. For example, various kinds of kernel-based interpolation may be used, which will take a larger number of input pixels into account when calculating the value of an output pixel. This can increase the accuracy of the output, at the expense of additional computation. Simpler interpolation techniques, such as nearest neighbor interpolation, are also possible if computational complexity must be minimized.

Conventionally, the entire image would be accumulated from all the swaths before running skew detection and correction algorithms. Skew detection can be performed on an image which is arriving swath by swath, based on the currently available image in the memory. Any suitable skew (rotation) estimation algorithms can be employed—these will be well known to the person skilled in the art. By way of example, the skew detection may be performed on a downscaled and binarized version of the input image.

As soon as a satisfactory skew angle is detected, image rotation can start. In AiOs/MFPs, the document image is also printed swath by swath based on the size of print head. Therefore, if the output image after skew correction is formed in swaths, the printing can start immediately as soon as the first swath is ready. This reduces the waiting time for the user and optimizes the memory requirement, thereby enabling an efficient embedded implementation. However, adaptation is necessary to the basic three-shear rotation algorithm to be amenable for such swath-based input/output.

Figure 5:
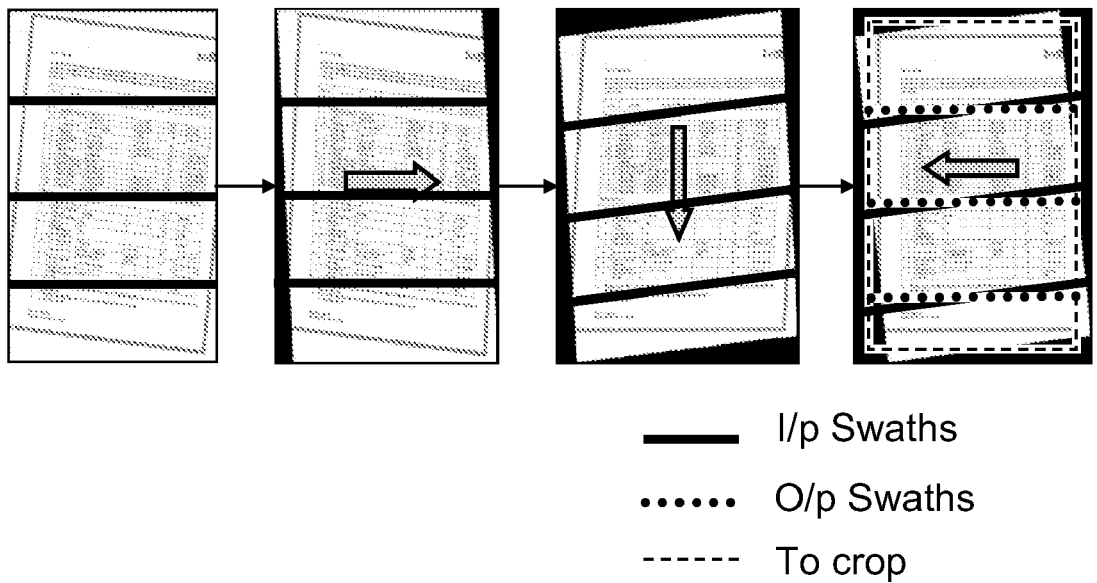
FIG. 5 illustrates how an image is processed according to a three-shear swath-based approach according to an embodiment.

The adaptation of the three-shear based image rotation for swath-based input and output will now be described. The fundamental design constraint is that enough input swaths need to be buffered so that the output swaths will be properly generated. FIG. 5 shows how this condition is met, in practice. FIG. 5 shows how a skewed input document in swaths is rotated using a swath-based approach. Each image shown is displayed as it might be stored in memory at each stage of the processing (assuming the image is raster-scanned in row order). At the left of the drawing is the input image. Input swaths are shown divided by solid lines. The shears (horizontal, vertical and horizontal) are applied successively from left to right. At the far-right of the drawing, the final output is shown. Output swaths are shown divided with round-dotted lines. The truncation at the boundary of the image (to crop the rotated output image to the same size as the input) is shown by the dashed rectangle. Comparison of the extent of the input and output swaths reveals that the first output swath overlaps both the first and second input swaths. That is, parts of the first and second input swaths are required in order to generate the first output swath. For swath-based processing, this means that both the first and second input swaths must be received and rotated before the first output is delivered. Buffering of a sufficient number of input swaths competes with the desire to produce output as quickly as possible and to use as little memory as possible.

Figure 6:
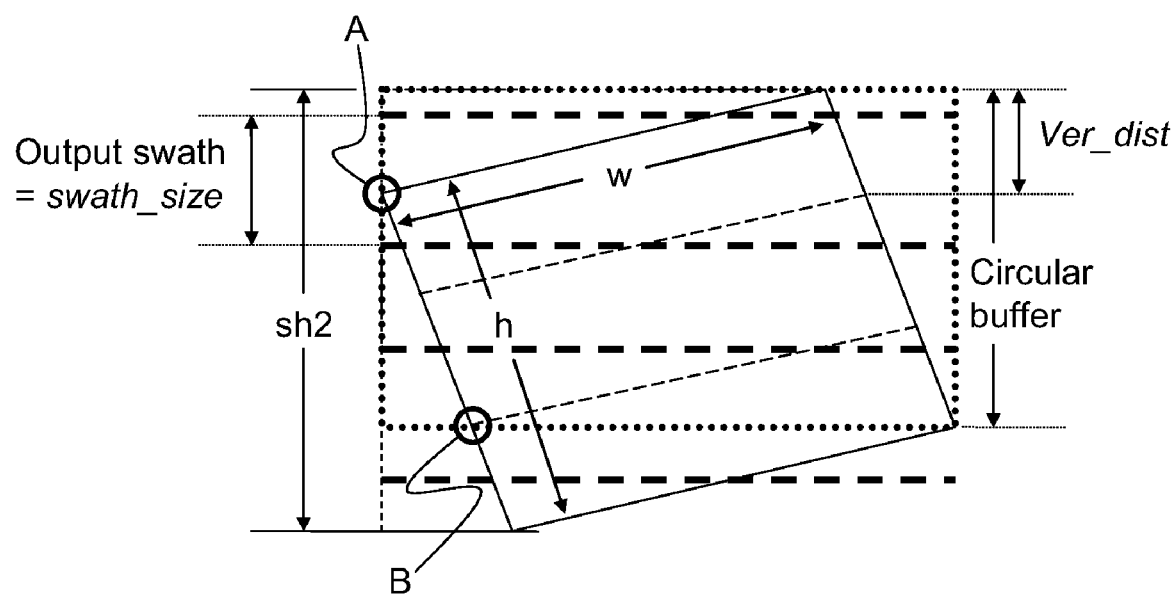
FIG. 6 shows how the result of the second vertical shear is stored in memory for swath-based input and output.

FIG. 6 illustrates the derivation of the optimal (minimal) number of swaths that need to be buffered. In FIG. 6, the outline of the input image (solid line rectangle) is drawn as it appears after the second vertical shear. The input swaths/segments comprising the input image (light dashed lines) are also shown. This shows how the rows of the buffer/memory (dotted line rectangle) correspond to the image content of the input image/swaths after the second vertical shear. The output swaths in the buffer are drawn as heavy dashed lines. The height of the output swaths at this stage is the same as that of the final output swaths, because the final (third, horizontal) shear transformation will only operate on individual rows in isolation, shifting them horizontally relative to one another.

Note that the start of the first output swath does not coincide with the top of the rotated input image, because of cropping (considered in greater detail below). Note also that the calculated minimum memory requirement is independent of the means of rotation. Thus, the method is not limited to rotation based on a plurality of shears. That is, swath-based image rotation can be implemented in any way, and the minimum memory requirement will remain the same.

As can be seen from FIG. 6, the first output swath requires input from the first and second input swaths. That is, the first output swath cannot be generated until the first and second input swaths are ready. Vertex A is the transformed position of the top-left corner of the input image and the start of the first swath. Vertex B is the bottom-left corner of the second input swath—that is, vertex B corresponds to the start of the last row of the second input swath. The position of A, together with the vertical distance from A to B, determines the size of the buffer. This will depend on the angle of rotation, theta.

In the current embodiment there is an additional requirement that the output image dimensions should be equal to the input to enable documents to be printed in the same sizes as they are scanned. In this case, it is necessary to crop the image after the last shear so that the cropped image size is equal to the input image size. That is, initially rows_to_crop number of rows will not be output anyway, as they would be cropped, where rows_to_crop=(shear3_height−image_height)/2. These rows need not be generated at all. For a proper output swath, swath_size rows need to be ready after rows_to_crop. If x swaths are to be buffered before the first output swath is ready, then from FIG. 6, it can be seen that:

$$x*\text{Ver\_dist} >= \text{swath\_size} \qquad (1)$$

Ver_dist is the difference in rows of the top-left corners of two successive swaths after the second (vertical) shear. Equivalently, it is the number of valid rows that can be filled with data after processing a single input swath.

$$\begin{aligned}\text{Ver\_dist} &= \{\text{image\_width}*\text{abs}(\sin(\theta)) + \\ &\quad (x+1)*\text{swath\_size}*\cos(\theta) + 1\} - \\ &\quad \{\text{image\_width}*\text{abs}(\sin(\theta)) + \\ &\quad x*\text{swath\_size}*\cos(\theta) + 1\} \\ &= \text{swath\_size}*\cos(\theta)\end{aligned} \qquad (2)$$

So, the minimum number of input swaths that are to be buffered for the first proper output swath is, ceil(1/cos(θ)). Here, ceil denotes the ceiling function. In order to store these input swaths, a circular buffer is used so as to optimize the reuse of memory. The circular buffer size and minimum memory required to buffer the second vertical shear output is:

$$\text{image\_width}*\text{abs}(\sin(\theta))+(\text{ceil}(1/\cos(\theta)))*\text{swath\_size}*\cos(\theta)+1 \quad (3)$$

The intermediate memory required is implemented as a circular buffer, whose size was computed as described above. The idea is that, once an output swath is dispatched (for example to the print-head to be printed) the next processed input swaths can be overwritten in the same memory space in a circular fashion. So, the first horizontal shear and the second vertical shear are processed for each input swath. The result of the first horizontal shear can be stored in a single buffer whose height is equal to the swath size, and whose width is equal to (image_width+swath_size*tan(θ/2)). The output of the second vertical shear is stored in the optimal memory buffer. After these two operations, the row number is checked to see if enough image data are available to produce the first output swath (see also the pseudo-code below). If not, the first and the second steps are repeated for the next input swath, until it becomes possible to produce an output swath. Then, when the first output swath is ready, the third horizontal shear is performed on the output swath, and the corresponding rows are overwritten on the buffer by the next input swath. The above steps are performed sequentially, until all the input swaths have been rotated properly. The pseudo-code for the proposed algorithm is as follows:

```
Allocate memory for circular buffer capable of storing minimum number
of swaths
Reset flag__first__output__ready = 0
for each input swath do
        Increment input swath number;
Perform horizontal shear of swath;
Perform vertical shear of swath and store result in circular buffer;
if (the minimum number of rows filled in circular buffer >=
rows__to__crop + swath__size) &&
(flag__first__output__ready = 0) do
/* Indicate that enough rows are available to generate the first output
swath */
        flag__first__output__ready = 1;
end
if flag__first__output__ready == 1 do
        Perform third horizontal shear of the output swath;
        Output swath;
        Increment output swath number;
end
end
for output swath number <= input swath number do
        Perform third horizontal shear of the output swath;
        Output swath;
        Increment output swath number;
end
```

As described above the run-time memory requirement of this algorithm depends on the image width, and the degree of skew. For example, consider the memory requirement for rotating a 2550×3300 image: storing the whole uncompressed (16-bit) image in memory would require 16 MB; according to the current embodiment, the corresponding memory requirement varies between 0.2 MB and 5 MB for rotation angles of 0 to 15 degrees.

The run-time memory requirement of the proposed algorithm is therefore much less than that of the traditional three-shear algorithm—in particular, for smaller rotation angles. The algorithm is also realized without any significant computational overhead.

Figure 7:
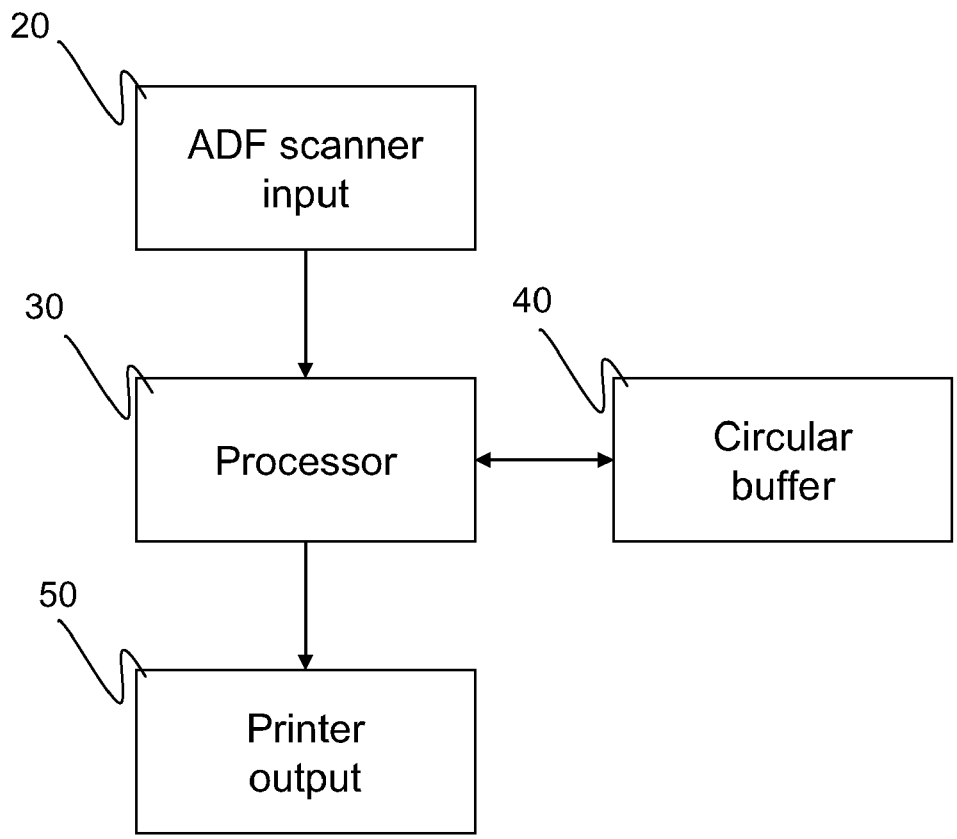
FIG. 7 is a block diagram of an image processing apparatus according to an embodiment.

FIG. 7 shows an exemplary embodiment of image processing apparatus adapted to perform the method described above. The apparatus includes an input (ADF scanner) 20 providing consecutive swaths of an input image in sequence. These are received by a processor 30, which manipulates each swath to effect the rotation transformation. In particular, it performs a transformation (or transformations) on each swath/segment and stores the transformed results in the memory (circular buffer) 40. The processor 30 is to access a computer readable medium that has stored thereon a computer program comprising computer program code for performing the rotation transformation. The computer readable medium may comprise a conventional data storage device, such as, a hard disk drive, a solid state drive, a removable data storage device, etc. When sufficient input swaths have been accumulated in the buffer 40, the processor reads the buffer to generate an output swath. This is output to a swath-based output device, such as a printer 50.

Figure 8:
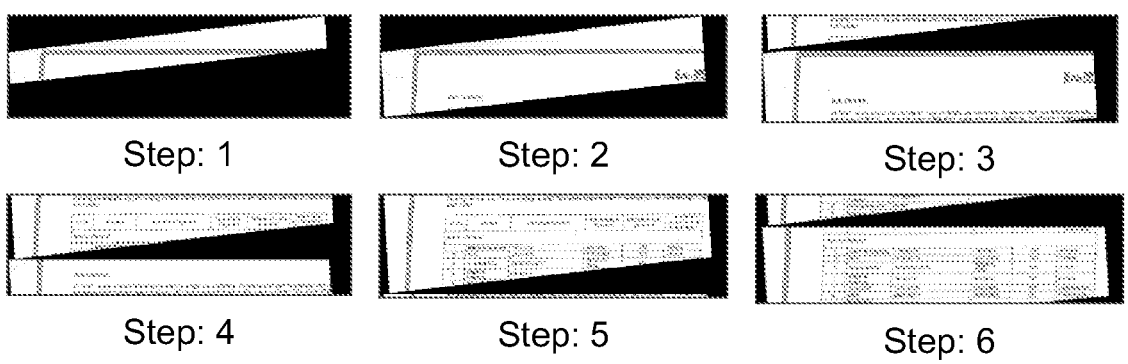
FIG. 8 shows examples of swaths of an image being rotated, as they are stored in the circular buffer.

FIG. 8 shows an example of the buffer contents when the apparatus of FIG. 8 executes a three-shear-based rotation according to the method described above. The swath size is 64 rows and the image is being rotated by 6.5 degrees. As described above, the circular buffer holds the swaths during the horizontal shear. In step 1, the first input swath is received; the first horizontal shear and second vertical shear are applied to the swath; and the result is stored in the buffer. In step 2, the same occurs for the second input swath. With two swaths now available, the first output swath can be generated by executing the third horizontal shear and outputting the result. Once this has been completed, the space in the buffer is reused, in step 3, for subsequent input swaths. Steps 4 to 6 show this processing repeating to buffer and transform further swaths.

Embodiments of the inventive concept therefore enable real-time rotation utilizing an optimally small memory buffer. Upon proper skew angle detection, swaths can be rotated in place and made available for printing, by skew-correcting them with the appropriate angle. This image rotation technique has broad applicability across the range of platforms among AiO printers and MFPs.

In the embodiments described above, bilinear interpolation is used to generate the shifted rows and columns of image pixels that comprise each shear transformation. As already noted, it is equally possible to use more advanced re-sampling schemes, such as kernel-based interpolation. As will be apparent to the skilled practitioner, when kernels larger than two pixels are used, the vertical shear operation on a given input swath will require access to image data from other adjacent swaths, in order to correctly calculate the values of pixels near the boundary of the swath. This will require additional memory, to temporarily buffer the output of the first horizontal swath. This additional memory is a cost of the more complex interpolation function. However, in some circumstances higher quality output may justify this overhead. Note, in this regard, that bilinear interpolation is advantageous because it maximizes the use of available input image information without requiring further buffering of image data.

In the embodiments described earlier, an additional requirement was imposed that the output image and input image be of the same size. This will be appropriate in many applications. However, it will inevitably result in cropping of some portions of the rotated image. As an alternative, if it is desired to retain all image information, a larger output image can be generated. This can easily be achieved, for example, by padding the input image with an appropriate number of background pixels.

The embodiments discussed above have focused on images which are delivered/stored row-wise. In this case, the implementation of the shear in the order row-column-row (that is, horizontal-vertical-horizontal) will be most efficient, since it is often more efficient to access memory sequentially and this will occur for the two row (horizontal) shears. Of course, this is not intended to limit the scope of the inventive concept. The three shears can equally be implemented in the order column-row-column.

As already noted above, the method is not limited to the implementation of rotation by shear transformations. Provided the input image is available in swaths, the rotation can be applied to these swaths in any suitable way. Various approaches to image rotation are well-known in the prior art. Different methods will have different advantages in different applications, as will be apparent to one skilled in the art. Any image rotation algorithm can be adapted, in the manner described above, to implement a swath-based rotation method.

In one example of such a method, the final result of rotating each swath is stored in the memory/buffer. This is in contrast with the specific embodiment described above, in which the memory is used to store an intermediate result—before the third, final shear transformation. As will be clear to the skilled person, some image rotation methods comprise multiple stages having intermediate results, while others are "single-pass" operations producing the rotated output directly from the input. The swath based approach is applicable in both cases, since either intermediate or final swath-results can be buffered in the memory, as appropriate.

As will also be readily apparent, although the method has been described in the context of correction of skew in scanned documents (where it is particularly beneficial), the approach is general, in that it can be applied to any image rotation task. Swath-based image rotation allows image rotation to be carried out in a pipelined fashion which may be advantageous in a wide variety of image processing applications other than, for example, ADF scanners.

While specific embodiments have been described herein for purposes of illustration, various other modifications will be apparent to a person skilled in the art and may be made without departing from the scope of the invention.

The invention claimed is:

1. A method of rotating an input image comprising a plurality of rows of input pixels by a predetermined arbitrary angle to generate a rotated output image comprising a plurality of rows of output pixels, the method comprising:
   receiving a first input segment comprising a first contiguous subset of the plurality of rows of input pixels;
   applying to the first input segment a transformation depending on the predetermined angle and storing the transformed result in a memory;
   receiving a second input segment comprising a second contiguous subset of the plurality of rows of input pixels, the second subset being adjacent to the first in the input image;
   applying the transformation to the second input segment and storing the transformed result in a memory; and
   generating a first output segment based on the transformed results of the first and second input segments prior to receipt of remaining input segments of input pixels of the input image, the output segment comprising a contiguous subset of the plurality of rows of output pixels.

2. The method of claim 1, wherein the memory comprises a circular buffer.

3. The method of claim 2, wherein the size of the circular buffer is chosen in dependence on the predetermined angle so as to accommodate the minimum number of transformed input segments necessary to generate an output segment.

4. The method of claim 1, wherein the transformation comprises:
   a first shear transformation along a first dimension; and
   a second shear transformation along a second dimension orthogonal to the first.

5. The method of claim 4, wherein the step of generating the first output segment comprises applying to the transformed results of the first and second input segments a third shear transformation along the first dimension.

6. The method of claim 5, wherein the first dimension is the pixel-row dimension and the pixels of the input segments and the transformed results are stored in row-order.

7. The method of claim 4, wherein at least one among the first, second and third shear transformations comprises bilinear interpolation between pixels.

8. A method of correcting the angle of skew of an input image, the method comprising:
   detecting the angle of skew; and
   rotating the image by the negative of the angle using the method of claim 1 so as to correct the skew.

9. A non-transitory computer readable medium on which is embedded a computer program, that when executed by a processor is to perform a method of rotating an input image comprising a plurality of rows of input pixels by a predetermined arbitrary angle to generate a rotated output image comprising a plurality of rows of output pixels, the computer program comprising computer readable code to:
   receive a first input segment comprising a first contiguous subset of the plurality of rows of input pixels;
   apply to the first input segment a transformation depending on the predetermined angle and storing the transformed result in a memory;
   receive a second input segment comprising a second contiguous subset of the plurality of rows of input pixels, the second subset being adjacent to the first in the input image;
   apply the transformation to the second input segment and storing the transformed result in a memory; and
   generate a first output segment based on the transformed results of the first and second input segments prior to receipt of remaining input segments of input pixels of the input image, the output segment comprising a contiguous subset of the plurality of rows of output pixels.

10. The computer readable medium of claim 9, wherein the memory comprises a circular buffer.

11. Image processing apparatus to rotate an input image comprising a plurality of rows of input pixels by a predetermined arbitrary angle to generate a rotated output image comprising a plurality of rows of output pixels, the apparatus comprising:
   a memory;
   input means for receiving a first input segment comprising a first contiguous subset of the plurality of rows of input pixels;
   segment transformation means for applying to the first input segment a transformation depending on the predetermined angle and for storing the transformed result in the memory;

input means for receiving a second input segment comprising a second contiguous subset of the plurality of rows of input pixels, the second subset being adjacent to the first in the input image;

segment transformation means for applying the transformation to the second input segment and for storing the transformed result in the memory; and output means for generating a first output segment based on the transformed results of the first and second input segments prior to receipt of remaining input segments of input pixels of the input image, the output segment comprising a contiguous subset of the plurality of rows of output pixels.

12. The apparatus of claim 11, wherein the memory comprises a circular buffer.

13. The apparatus of claim 12, wherein the size of the circular buffer is chosen in dependence on the predetermined angle so as to accommodate the minimum number of transformed input segments necessary to generate an output segment.

14. The apparatus of claim 11, wherein the transformation comprises:
 a first shear transformation along a first dimension; and
 a second shear transformation along a second dimension orthogonal to the first.

15. The apparatus of claim 14, wherein the output means is to generate the first output segment by applying to the transformed results of the first and second input segments a third shear transformation along the first dimension.

* * * * *